Dec. 12, 1967  J. BECKER  3,357,774
PHOTOGRAPHIC WIDE-ANGLE OBJECTIVE OF LARGE RELATIVE
APERTURE HAVING FIVE AIR SPACED COMPONENTS
Filed Oct. 30, 1963
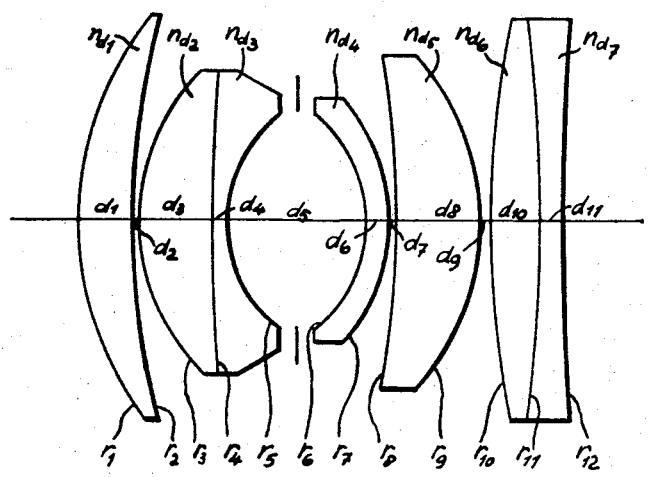
INVENTOR
JOHANNES BECKER
BY
ATTORNEYS

United States Patent Office 3,357,774
Patented Dec. 12, 1967

3,357,774
PHOTOGRAPHIC WIDE-ANGLE OBJECTIVE OF LARGE RELATIVE APERTURE HAVING FIVE AIR SPACED COMPONENTS
Johannes Becker, Delft, Netherlands, assignor to N.V. Optische Industrie "De Oude Delft," Delft, Netherlands, a corporation
Filed Oct. 30, 1963, Ser. No. 320,125
Claims priority, application Netherlands, Nov. 5, 1962, 285,066
2 Claims. (Cl. 350—176)

The invention relates to a photographic wide-angle objective of large relative aperture which consists of five air-spaced components, the first component being a single meniscus lens of positive power which is convex to the object, the second component being a meniscus shaped doublet of negative power which is convex to the object and consists of a positive lens on the side of the object and a negative lens on the side of the image, the third component being a single meniscus lens of negative power which is convex to the image, the fourth component being a single meniscus lens of positive power which is convex to the image, and the fifth component being a meniscus shaped doublet of positive power which is convex to the object and consists of a positive lens on the side of the object and a negative lens on the side of the image, the second and third component having the diaphragm position between them. An objective of this type which is adapted to a field angle of 63° and a relative aperture of $f:1.8$ has been described in the United States patent specification No. 2,896,506.

The present invention has for its principal object to further increase the relative aperture of this type of objective and/or to further improve the image quality in a large field of view.

To this end the objective according to the invention is characterized in that the following conditions have been satisfied:

$$n_5 > 1.80$$

$$10 r_7 > r_8 > 5 r_7$$

$$0.22 f > d_7 + d_8 > 0.16 f$$

$n_5$ being the refractive index of the fourth component for the $d$-line of the spectrum, $r_7$ and $r_8$ being the radii of curvature of the convex surface of the third component and the concave surface of the fourth component, respectively, $d_7$ and $d_8$ being the axial distance between the third and fourth component and the axial thickness of the fourth component, respectively, and $f$ being the focal length of the objective.

By thus increasing, in accordance with my invention, the refractive index of the fourth component and flattening the convex surface thereof, while at the same time selecting specific values for the curvature of the airspace between the third and fourth components and the distance between the convex surfaces of these two components, respectively, I have discovered that the contribution of the fourth component to the Petzval sum could be decreased to such a degree that, while maintaining or even improving the correction for coma and astigmatism, the relative aperture can be raised to a value hitherto unattainable for this type of objective.

Preferably, in carrying out my invention, I take for the radii of curvature of the remaining refractive surfaces and for the overall length of the objective, respectively, values satisfying the following combination of conditions:

$$0.7 f > r_1 > 0.55 f$$

$$2 f > r_2 > f$$

$$0.45 f > r_3 > 0.35 f$$

$$10 f > r_4 > 2 f$$

$$0.3 f > r_5 > 0.2 f$$

$$0.3 f > r_6 > 0.2 f$$

$$0.55 f > r_9 > 0.45 f$$

$$3.5 r_{10} > r_{12} > 2 r_{10}$$

$$f > d > 0.85 f$$

in which $r_n$ is the radius of curvature of the $n^{\text{th}}$ refractive surface ($n$ increasing from the side of the object to the side of the image), and $\Sigma d$ is the sum of all axial lens thicknesses and axial distances between consecutive lenses.

The optical data of two examples of the objective according to the invention are collected in the following Tables A and B. Table A relates to an objective having a field of view of 65° and a relative aperture $f:1.7$, Table B to an objective having a field of 60° and a relative aperture $f:1.6$. In the tables $r_n$ is the radius of curvature of the $n^{\text{th}}$ refractive surface, $d_n$ is the $n^{\text{th}}$ lens thickness or distance in air between consecutive lenses taken along the optical axis. $n_{dn}$ is the refractive index for the $d$-line of the spectrum and $\nu_n$ is the Abbé number of the $n^{\text{th}}$ lens, $n$ increasing from the side of the object to the side of the image. The components of the objective are numbered I–V.

TABLE A
[$f=1$; F:1.7; 65°]

| Component | Radius of curvature $r$ | Lens thickness or Lens distance $d$ | Refractive index $n_d$ | Abbé number $\nu$ |
|---|---|---|---|---|
| I | $r_1 = +0.6329$ | $d_1 = 0.1056$ | $n_{d1} = 1.6937$ | $\nu_1 = 53.5$ |
|   | $r_2 = +1.5181$ | $d_2 = 0.0023$ | | |
| II | $r_3 = +0.4086$ | $d_3 = 0.1414$ | $n_{d2} = 1.6519$ | $\nu_2 = 58.3$ |
|    | $r_4 = +4.692$  | $d_4 = 0.0264$ | $n_{d3} = 1.6131$ | $\nu_3 = 37.0$ |
|    | $r_5 = +0.2548$ | $d_5 = 0.2563$ | | |
| III | $r_6 = -0.2673$ | $d_6 = 0.0451$ | $n_{d4} = 1.7616$ | $\nu_4 = 26.5$ |
|     | $r_7 = -0.3600$ | $d_7 = 0.0155$ | | |
| IV | $r_8 = -1.8252$ | $d_8 = 0.1554$ | $n_{d5} = 1.8038$ | $\nu_5 = 46.8$ |
|    | $r_9 = -0.4800$ | $d_9 = 0.0016$ | | |
| V | $r_{10} = +1.9557$ | $d_{10} = 0.0948$ | $n_{d6} = 1.6424$ | $\nu_6 = 58.1$ |
|   | $r_{11} = -3.0997$ | $d_{11} = 0.0365$ | $n_{d7} = 1.7400$ | $\nu_7 = 28.2$ |
|   | $r_{12} = +6.0439$ | | | |

TABLE B
[$f=1$; F:1.6; 60°]

| Component | Radius of curvature $r$ | Lens thickness or Lens distance $d$ | Refractive index $n_d$ | Abbé number $\nu$ |
|---|---|---|---|---|
| I | $r_1 = +0.6208$ | $d_1 = 0.1038$ | $n_{d1} = 1.7338$ | $\nu_1 = 51.0$ |
|   | $r_2 = +1.3898$ | $d_2 = 0.0014$ | | |
| II | $r_3 = +0.4197$ | $d_3 = 0.1436$ | $n_{d2} = 1.6775$ | $\nu_2 = 55.5$ |
|    | $r_4 = +5.0461$ | $d_4 = 0.0277$ | $n_{d3} = 1.6364$ | $\nu_3 = 35.4$ |
|    | $r_5 = +0.2588$ | $d_5 = 0.2560$ | | |
| III | $r_6 = -0.2658$ | $d_6 = 0.0455$ | $n_{d4} = 1.8055$ | $\nu_4 = 25.5$ |
|     | $r_7 = -0.3573$ | $d_7 = 0.0021$ | | |
| IV | $r_8 = -1.9632$ | $d_8 = 0.1849$ | $n_{d5} = 1.8038$ | $\nu_5 = 46.8$ |
|    | $r_9 = -0.4874$ | $d_9 = 0.0021$ | | |
| V | $r_{10} = +1.8744$ | $d_{10} = 0.0946$ | $n_{d6} = 1.6424$ | $\nu_6 = 58.1$ |
|   | $r_{11} = -3.1115$ | $d_{11} = 0.0363$ | $n_{d7} = 1.7400$ | $\nu_7 = 28.2$ |
|   | $r_{12} = +5.5331$ | | | |

In the attached drawing an objective according to the invention is schematically illustrated, the quantities $r_1$–$r_{12}$, $d_1$–$d_{11}$ and $n_{d1}$–$n_{d7}$, appearing in the Tables A and B, being indicated therein.

The dividing surfaces between the positive and negative lenses of the doublet components II and V will preferably be cemented. However, it is evident that a narrow airspace may be maintained between the two lenses of these doublets, in which case the two lens surfaces facing each other may have equal or slightly different radii of curvature.

I claim:

1. Photographic wide-angle objective of large relative aperture consisting of five air spaced components, the first component being a single meniscus lens of positive power which is convex to the object, the second component being a meniscus shaped doublet of negative power which is convex to the object and consists of a positive lens on the side of the object and a negative lens on the side of the image, the third component being a single meniscus lens of negative power which is convex to the image, the fourth component being a single meniscus lens of positive power which is convex to the image, and the fifth component being a meniscus shaped doublet of positive power which is convex to the object and consists of a positive lens on the side of the object and a negative lens on the side of the image, the second and third components having the diaphragm positioned between them, characterized in that the following conditions are satisfied:

$$n_5 > 1.80$$
$$10r_7 > r_8 > 5r_7$$
$$0.22f > d_7 + d_8 > 0.16f$$

said objective more particularly having substantially the following optical data:

[$f=1$]

| Component | Radius of curvature r | Lens thickness or Lens distance d | Refractive index $n_d$ | Abbé number $\nu$ |
|---|---|---|---|---|
| I | $r_1 = +0.6329$ | $d_1 = 0.1056$ | $n_{d1}=1.6937$ | $\nu_1=53.5$ |
| | $r_2 = +1.5181$ | $d_2 = 0.0023$ | | |
| II | $r_3 = +0.4086$ | $d_3 = 0.1414$ | $n_{d2}=1.6519$ | $\nu_2=58.3$ |
| | $r_4 = +4.692$ | $d_4 = 0.0264$ | $n_{d3}=1.6131$ | $\nu_3=37.0$ |
| | $r_5 = +0.2548$ | $d_5 = 0.2563$ | | |
| III | $r_6 = -0.2673$ | $d_6 = 0.0451$ | $n_{d4}=1.7616$ | $\nu_4=26.5$ |
| | $r_7 = -0.3600$ | $d_7 = 0.0155$ | | |
| IV | $r_8 = -1.8252$ | $d_8 = 0.1554$ | $n_{d5}=1.8038$ | $\nu_5=46.8$ |
| | $r_9 = -0.4800$ | $d_9 = 0.0016$ | | |
| V | $r_{10} = +1.9557$ | $d_{10}=0.0948$ | $n_{d6}=1.6424$ | $\nu_6=58.1$ |
| | $r_{11} = -3.0997$ | $d_{11}=0.0365$ | $n_{d7}=1.7400$ | $\nu_7=28.2$ |
| | $r_{12}=+6.0439$ | | | | where $r_n$ is the radius of curvature of the $n^{th}$ refractive surface, $d_n$ is the $n^{th}$ lens thickness or distance in air between consecutive lenses taken along the optical axis, $n_{dn}$ is the refractive index for the $d$-line of the spectrum and $\nu_n$ is the Abbé number of the $n^{th}$ lens, $n$ increasing from the side of the object to the side of the image.

2. Photographic wide-angle objective of large relative aperture consisting of five air spaced components, the first component being a single meniscus lens of positive power which is convex to the object, the second component being a meniscus shaped doublet of negative power which is convex to the object and consists of a positive lens on the side of the object and a negative lens on the side of the image, the third component being a single meniscus lens of negative power which is convex to the image, the fourth component being a single meniscus lens of positive power which is convex to the image, and the fifth component being a meniscus shaped doublet of positive power which is convex to the object and consists of a positive lens on the side of the object and a negative lens on the side of the image, the second and third components having the diaphragm positioned between them, characterized in that the following conditions are satisfied:

$$n_5 > 1.80$$
$$10r_7 > r_8 > 5r_7$$
$$0.22f > d_7 + d_8 > 0.16f$$

said objective more particularly having substantially the following optical data:

[$f=1$]

| Component | Radius of curvature r | Lens thickness or Lens distance d | Refractive index $n_d$ | Abbé number $\nu$ |
|---|---|---|---|---|
| I | $r_1 = +0.6208$ | $d_1 = 0.1038$ | $n_{d1}=1.7338$ | $\nu_1=51.0$ |
| | $r_2 = +1.3898$ | $d_2 = 0.0014$ | | |
| II | $r_3 = +0.4197$ | $d_3 = 0.1436$ | $n_{d2}=1.6775$ | $\nu_2=55.5$ |
| | $r_4 = +5.0461$ | $d_4 = 0.0277$ | $n_{d3}=1.6364$ | $\nu_3=3.4$ |
| | $r_5 = +0.2588$ | $d_5 = 0.2560$ | | |
| III | $r_6 = -0.2658$ | $d_6 = 0.0455$ | $n_{d4}=1.8055$ | $\nu_4=25.5$ |
| | $r_7 = -0.3573$ | $d_7 = 0.0021$ | | |
| IV | $r_8 = -1.9632$ | $d_8 = 0.1849$ | $n_{d5}=1.8038$ | $\nu_5=46.8$ |
| | $r_9 = -0.4874$ | $d_9 = 0.0021$ | | |
| V | $r_{10}=+1.8744$ | $d_{10}=0.0946$ | $n_{d6}=1.6424$ | $\nu_6=58.1$ |
| | $r_{11}=-3.1115$ | $d_{11}=0.0363$ | $n_{d7}=1.7400$ | $\nu_7=28.2$ |
| | $r_{12}=+5.5331$ | | | | where $r_n$ is the radius of curvature of the $n^{th}$ refractive surface, $d_n$ is the $n^{th}$ lens thickness or distance in air between consecutive lenses taken along the optical axis, $n_{dn}$ is the refractive index for the $d$-line of the spectrum and $\nu_n$ is the Abbé number of the $n^{th}$ lens, $n$ increasing from the side of the object to the side of the image.

References Cited

UNITED STATES PATENTS 2,896,506  7/1959  Azuma _____ 88—57 X

JEWELL H. PEDERSEN, *Primary Examiner.*

JOHN K. CORBIN, *Examiner.*